United States Patent
Sangli et al.

(10) Patent No.: US 11,128,201 B2
(45) Date of Patent: Sep. 21, 2021

(54) METHOD AND ASSEMBLY OF A STATOR SLEEVE

(71) Applicant: GE AVIATION SYSTEMS LLC, Grand Rapids, MI (US)

(72) Inventors: Pradeep Hemant Sangli, Bangalore (IN); Santosh Kumar Prasad, Bangalore (IN); Todd Eric Rook, Tipp City, OH (US)

(73) Assignee: GE Aviation Systems LLC, Grand Rapids, MI (US)

(*) Notice: Subject to any disclaimer, the term of this patent is extended or adjusted under 35 U.S.C. 154(b) by 283 days.

(21) Appl. No.: 15/696,801

(22) Filed: Sep. 6, 2017

(65) Prior Publication Data
US 2019/0074750 A1    Mar. 7, 2019

(51) Int. Cl.
| H02K 9/19 | (2006.01) |
|---|---|
| H02K 1/20 | (2006.01) |
| H02K 3/24 | (2006.01) |
| H02K 5/20 | (2006.01) |
| H02K 7/18 | (2006.01) |

(52) U.S. Cl.
CPC .............. *H02K 9/19* (2013.01); *H02K 1/20* (2013.01); *H02K 3/24* (2013.01); *H02K 5/20* (2013.01); *H02K 7/1823* (2013.01)

(58) Field of Classification Search
CPC .. H02K 1/20; H02K 9/19; H02K 3/24; H02K 5/20; H02K 7/1823
See application file for complete search history.

(56) References Cited

U.S. PATENT DOCUMENTS

| 3,440,461 | A | | 4/1969 | Potter |
| 3,441,758 | A | * | 4/1969 | Albright ................. H02K 9/10 |
| | | | | 310/58 |
| 4,250,423 | A | | 2/1981 | Linscott, Jr. |
| 4,514,652 | A | | 4/1985 | Olson |
| 5,357,180 | A | * | 10/1994 | Speicher ............. H02K 16/025 |
| | | | | 310/114 |
| 5,633,543 | A | | 5/1997 | Boardman, IV |
| 5,652,469 | A | | 7/1997 | Jarczynski |
| 7,728,447 | B2 | | 6/2010 | Becquerelle et al. |

(Continued)

FOREIGN PATENT DOCUMENTS

| CN | 1894841 A | 1/2007 |
| CN | 101235753 A | 8/2008 |

(Continued)

OTHER PUBLICATIONS

Chinese Patent Office, Office Action re Application No. 201811037468.2, dated Mar. 3, 2020, 8 pages, China.

(Continued)

*Primary Examiner* — Thienvu V Tran
*Assistant Examiner* — Bart Iliya
(74) *Attorney, Agent, or Firm* — McGarry Bair PC

(57) ABSTRACT

A stator sleeve assembly for an electric machine includes a first cylindrical housing portion defining an inner radial cavity defined by at least one circumferential wall and an outer radial cavity, and a set of radial passages fluidly connecting the inner radial cavity with the outer radial cavity, and a second cylindrical housing portion defining a third cavity, the second housing portion axially spaced from the first housing portion.

19 Claims, 7 Drawing Sheets

(56) References Cited

U.S. PATENT DOCUMENTS

| | | | |
|---|---|---|---|
| 8,179,002 | B2 | 5/2012 | Maduskuie |
| 8,183,723 | B2 | 5/2012 | Baumann |
| 8,269,384 | B2 | 9/2012 | Bradfield |
| 8,450,888 | B2 | 5/2013 | Toot |
| 8,487,489 | B2 | 7/2013 | Palafox |
| 8,519,577 | B2 | 8/2013 | Stiesdal |
| 8,519,578 | B2 | 8/2013 | Pal |
| 8,558,422 | B2 | 10/2013 | Baumann |
| 8,698,361 | B2 | 4/2014 | Stiesdal |
| 9,106,109 | B2 | 8/2015 | Seibicke |
| 9,225,208 | B2 | 12/2015 | Nayak |
| 2007/0295568 | A1 | 12/2007 | Vasilescu |
| 2011/0133580 | A1* | 6/2011 | Sugimoto ............... H02K 1/20 310/54 |
| 2011/0254392 | A1* | 10/2011 | Bradfield ............... H02K 1/20 310/59 |
| 2012/0262013 | A1* | 10/2012 | Chamberlin ........... H02K 5/20 310/65 |
| 2013/0009497 | A1* | 1/2013 | Chang .................... H02K 9/14 310/62 |
| 2013/0038151 | A1* | 2/2013 | Ohashi .................. H02K 1/32 310/59 |
| 2015/0180288 | A1 | 6/2015 | Roeer |
| 2015/0372565 | A1 | 12/2015 | Thomas |
| 2015/0372566 | A1 | 12/2015 | Thomas |
| 2016/0023374 | A1 | 1/2016 | Kegeris |
| 2016/0211721 | A1 | 7/2016 | Garmon |

FOREIGN PATENT DOCUMENTS

| | | |
|---|---|---|
| CN | 102934328 A | 2/2013 |
| CN | 103688085 A | 3/2014 |
| CN | 204376659 U | 6/2015 |
| CN | 107070021 A | 8/2017 |
| CN | 206370743 U | 8/2017 |
| EP | 2109206 A1 | 10/2009 |
| EP | 2477311 A1 | 7/2012 |
| EP | 2958217 A1 | 12/2015 |
| EP | 3054565 A1 | 8/2016 |
| GB | 851971 A | 10/1960 |
| JP | 56032537 A | 2/1985 |
| JP | H0515109 A | 1/1993 |
| JP | 2015198527 A | 11/2015 |
| WO | 2014054830 A1 | 4/2014 |
| WO | 20161497031 W | 9/2016 |

OTHER PUBLICATIONS

Chinese Patent Office, Office Action re Corresponding Application No. 201811037468.2, dated Sep. 4, 2020, 8 pages, China.

* cited by examiner

METHOD AND ASSEMBLY OF A STATOR SLEEVE

BACKGROUND OF THE INVENTION

Electric machines, such as generators, provide for the generation of electricity from a mechanical force. The generation of the electricity occurs due to the interaction of a rotating magnetic field in relation to a set of conductive windings. In one generator example, a rotor rotated by a mechanical force can generate the rotating magnetic field relative to a stationary stator having a set of conductive windings. The interaction generates a current in the stator windings, which can be provided to the power output of the generator, where it can be further transmitted to power an electrical load.

BRIEF DESCRIPTION OF THE INVENTION

In one aspect, the disclosure relates to a stator sleeve assembly including a first cylindrical housing portion defining an inner radial cavity defined by at least one circumferential wall and an outer radial cavity defined by at least two circumferential walls, the outer radial cavity overlying at least an axial portion of the inner radial cavity, and a set of radial passages fluidly connecting the inner radial cavity with the outer radial cavity, a second cylindrical housing portion defining a third cavity, the second housing portion axially spaced from the first housing portion, and a set of circumferentially spaced axial fluid passages fluidly connecting the outer radial cavity with the third cavity.

In another aspect, the disclosure relates to a stator assembly for an electric machine including a stator core having multiple posts, multiple windings, with a winding provided on each of the posts, and a stator sleeve located about the stator core and an inner surface confronting the stator core. The state sleeve further includes a first cylindrical housing portion defining an inner radial cavity in a thermally conductive confronting relationship with the stator core and an outer radial cavity, the outer radial cavity overlying at least an axial portion of the inner radial cavity, and a set of radial passages fluidly connecting the inner radial cavity with the outer radial cavity, a second cylindrical housing portion defining a third cavity, the second housing portion axially spaced from the first housing portion, and a set of circumferentially spaced axial fluid passages fluidly connecting the outer radial cavity with the third cavity. The inner radial cavity, the set of radial passages, the outer radial cavity, the axial fluid passages, and the third cavity define a fluid coolant flow path whereby coolant can be provided to the inner radial cavity to the third cavity.

In yet another aspect, the disclosure relates to a method of cooling a stator assembly, the method including receiving a fluid coolant flow to a first housing portion having an inner radial cavity thermally connected with the stator assembly, delivering the fluid coolant flow to an outer radial cavity of the first housing portion, the outer radial cavity overlapping at least a portion of the inner radial cavity, and fluidly connected with the inner radial cavity by a set of radial passages circumferentially spaced about the first housing portion, and delivering the fluid coolant flow to a second housing portion axially spaced from the first housing portion and fluidly connected with the outer radial cavity by a set of circumferentially spaced fluid passages. The fluid coolant flow removes heat from the stator assembly.

DESCRIPTION OF EMBODIMENTS OF THE INVENTION

Figure 1:
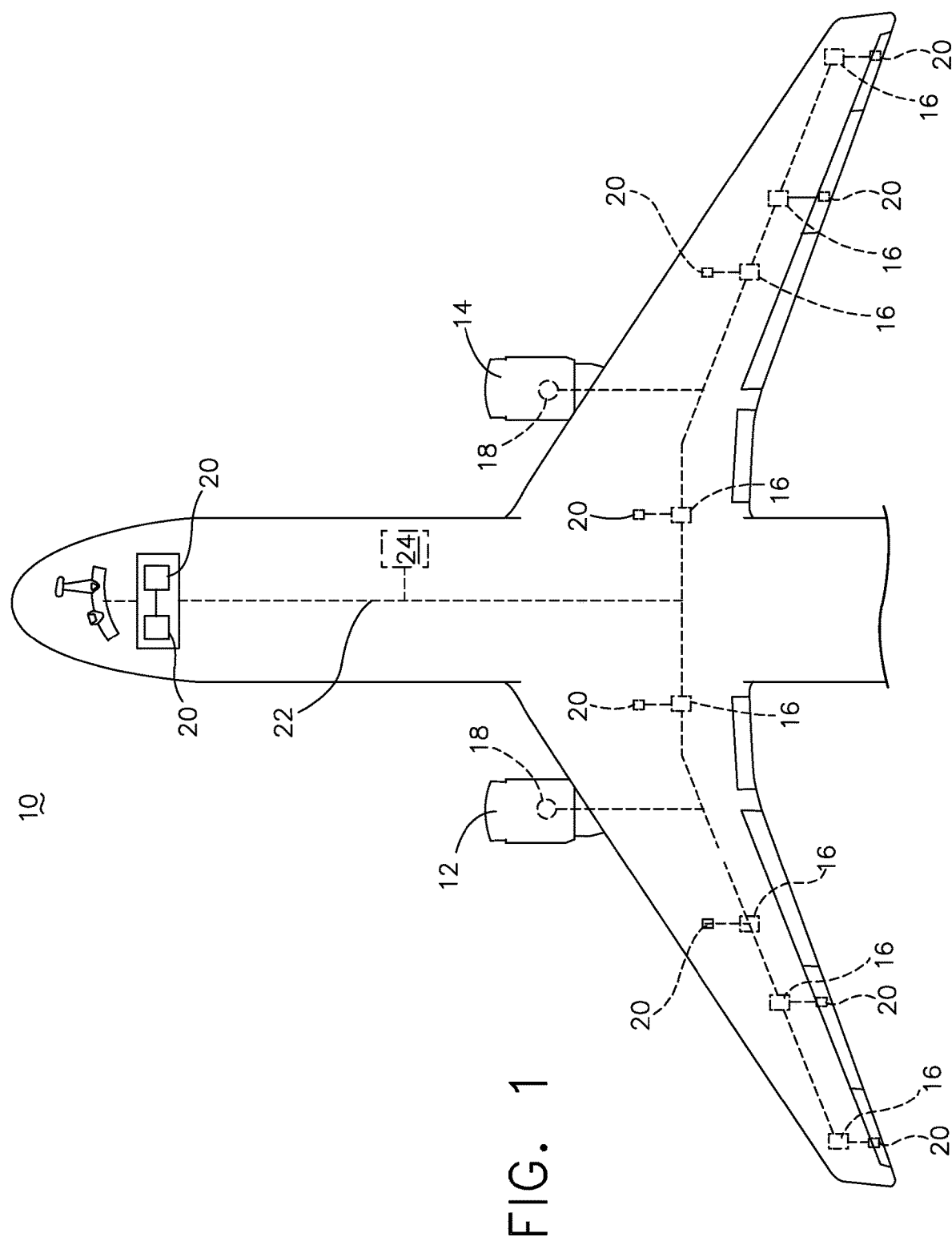
FIG. 1 is a top down schematic view of the aircraft and power system architecture of an aircraft having a backup generator, in accordance with various aspects described herein.

Aspects of the disclosure can be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations can be included in the machine.

While "a set of" various elements will be described, it will be understood that "a set" can include any number of the respective elements, including only one element. As used herein, the terms "axial" or "axially" refer to a dimension along a longitudinal axis of a component, such as a rotational shaft. As used herein, the terms "radial" or "radially" refer to a dimension extending between a center longitudinal axis of the referential component, an outer circumference, or a circular or annular component disposed relative to the referential component. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

The exemplary drawings are for purposes of illustration only and the dimensions, positions, order and relative sizes reflected in the drawings attached hereto can vary. While this description is primarily directed toward an electric machine providing power generation or backup power generation, including but not limited supplemental, redundant, emergency power generation, or the like, it is also applicable to an electric machine providing a driving force or an electric machine providing both a driving force and power generation. Further, while this description is primarily directed toward an aircraft environment, aspects of the disclosure are applicable in any electric machine environment. Thus, a brief summary of a contemplated environment should aid in a more complete understanding.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as a first electric machine or a generator 18. Non-limiting aspects of the disclosure can include, for example, additional power sources. For example, the aircraft 10 can include supplemental power sources, redundant power sources, auxiliary power sources, or emergency operation power sources, including but not limited to set of generators 18, a backup generator 24, or a set of electrical power storage units, such as batteries. The aircraft is shown further having a set of power-consuming components, or electrical loads 20, including, but not limited to, an actuator load, flight critical loads, and non-flight critical loads.

The electrical loads 20 are electrically coupled with at least one of the power sources 18, 24 via a power distribution system including, for instance, power transmission lines 22 or bus bars, and power distribution nodes 16. It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the set of generators 18. The set of generators 18, in turn, generate power, such as alternating current (AC) or direct current (DC) power, and provides the generated power to the transmission lines 22, which delivers the power to the electrical loads 20, positioned throughout the aircraft 10. The additional sources of power, such as the backup generator 24 or the like, can be operably configured to generate electrical power for the power distribution system constantly, intermittently, or in response to a demand for power, as needed. Additional power sources for providing power to the electrical loads 20, such as emergency power sources, ram air turbine systems, generators, auxiliary power units (APUs), batteries, or the like, can be included, and can substitute for the power source. The additional power sources can provide electrical power to the set of transmission lines 22, or another power distribution connection, to supply the electrical power to at least one electrical load 20 or power-consuming component. Non-limiting aspect of the disclosure can include at least a subset of the power sources configured, operated, or enabled to generate electrical power at a predetermined set of electrical characteristics. Non-limiting examples of predetermined electrical characteristics can include, but are not limited to, AC or DC power, current levels, frequency, voltage levels, or a combination thereof.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included.

Example power distribution management functions can include, but are not limited to, selectively enabling or disabling the delivery of power to particular electrical loads 20, by way of the operable connection, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one additional power source can be operated, enabled, or connected for providing power to the electrical loads 20. Additional management functions can be included.

It will be understood that while aspects of the disclosure are shown in an aircraft environment of FIG. 1, the disclosure is not so limited and has general application to electrical power systems in non-aircraft applications, such as other mobile applications and non-mobile industrial, commercial, and residential applications. For example, while this description is directed toward a generator 18 or backup generator 24 for an aircraft 10 or a power system architecture in an aircraft 10, aspects of the disclosure can be further applicable to any electrical machine, stator sleeve, or the like. It will be understood that the illustrated aspects of the disclosure are only one non-limiting example of an aircraft 10, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft (e.g. the electrical loads 20 on the wings of the aircraft 10, etc.), aspects of the disclosure are not so limited, and the components are not so limited based on their schematic depictions. Additional aircraft 10 configurations are envisioned.

It will be understood that while one aspect of the disclosure is shown in an aircraft environment, the disclosure is not so limited and has general application to electrical power systems in non-aircraft applications, such as other mobile applications and non-mobile industrial, commercial, and residential applications.

Figure 2:
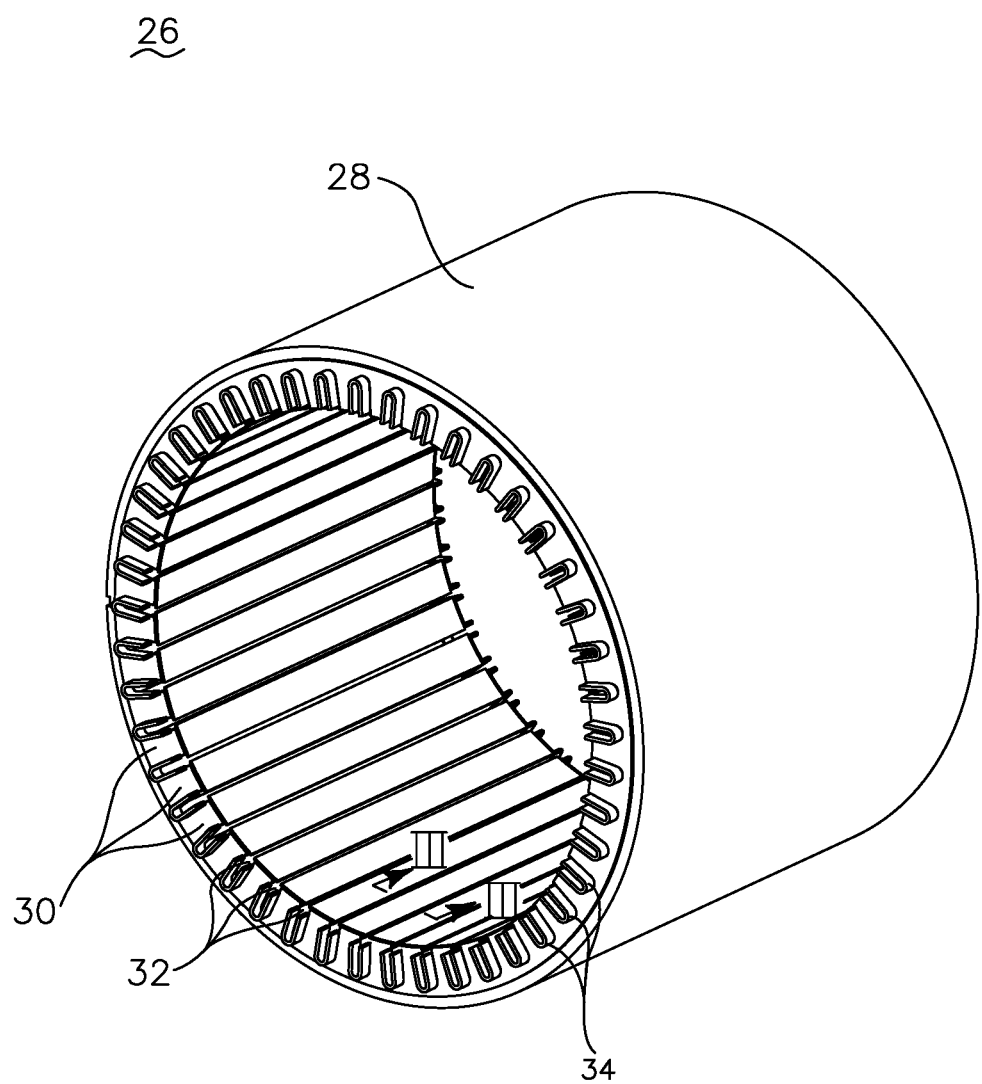
FIG. 2 is an isometric view of a stator assembly of a generator, in accordance with various aspects described herein.

FIG. 2 illustrates a non-limiting example of a stator assembly 26 for an electric machine, such as the generator 18 or backup generator 24. The stator assembly 26 shown can include any stator assembly for one or more sections of an electric machine, including, but not limited to, a main machine (or main power generation assembly), and exciter assembly, a permanent magnet generator assembly, or the like, and is not germane to the disclosure. The stator assembly 26, as shown, comprises a generally cylindrical core 28, a set of posts 30, at least one winding slot 32, and can optionally include at least one slot liner 34 provided for at least some of the winding slots 32. The surface at the inner perimeter of the core 28 includes the set of spaced posts 30, extending radially inward from the core 28 and defining the corresponding set of spaced winding slots 32 therebetween. The set of spaced posts 30 and the corresponding set of spaced winding slots 32 can be radially arranged at a predetermined spacing in the circumferential direction. The set of winding slots 32 can be configured with an open top facing the circumferential center point of the core 28 and can terminate in opposing open ends spaced axially along the core 28. For instance, the ends of the winding slot 32 can axially terminate at the same length as the core 28. A slot liner 34 can be disposed along the inner perimeter of the winding slot 32 defining an open top facing the circumferential center point of the core 28 and terminating in opposing ends which are shown extending beyond the winding slot 32 open ends. In another example, the slot liner 34 terminating ends do not extend beyond the winding slot 32 open ends. The core 28 can be formed from a set of laminations, but alternate forming or machining of materials is envisioned.

Figure 3:
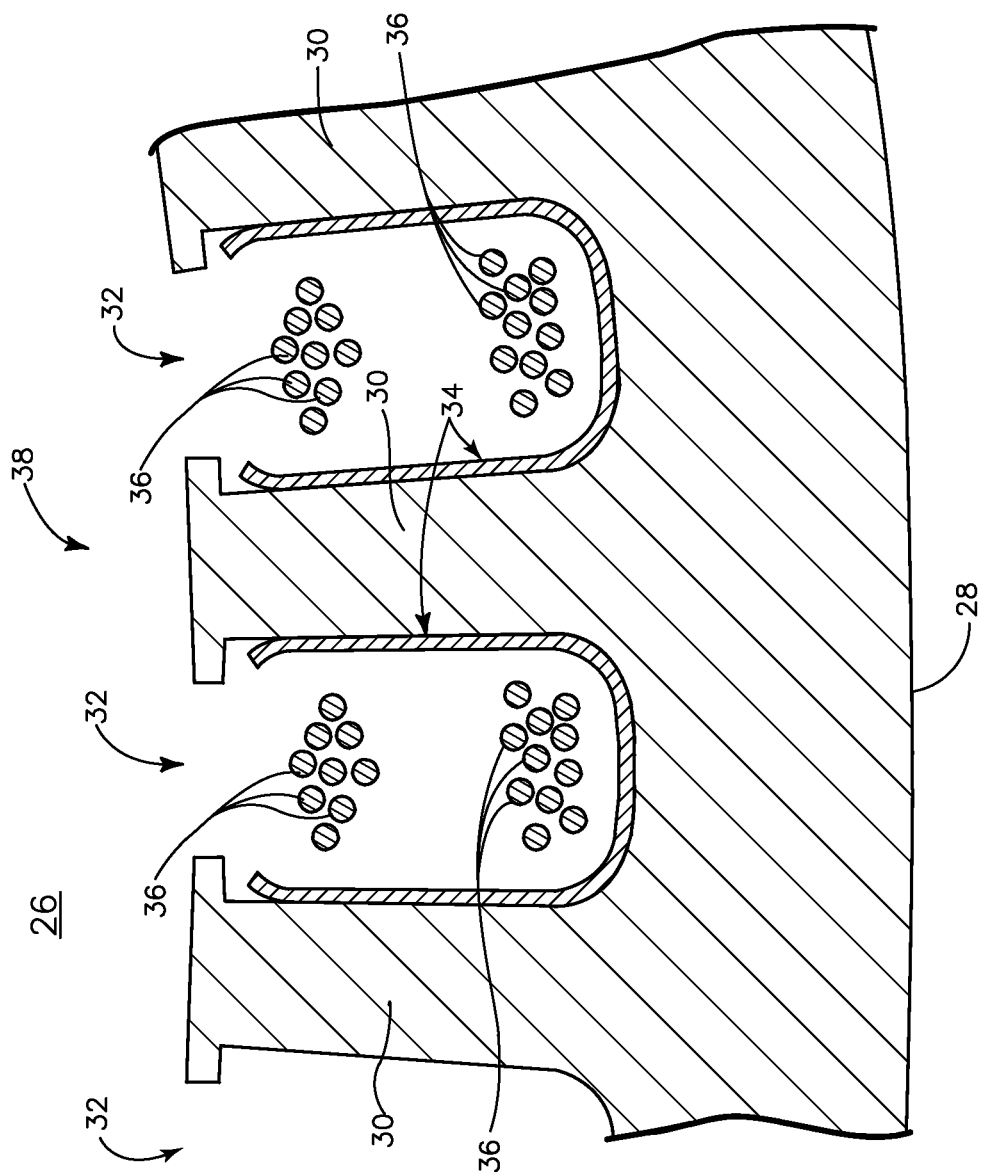
FIG. 3 is a partial sectional view taken along line of FIG. 2 showing a winding slot and slot liner of the stator assembly, in accordance with various aspects described herein.

FIG. 3 illustrates a sectional view of a configuration of a set of winding slots 32 of an assembled stator assembly 26 having a set of stator windings 36. The stator windings 36 comprise conductive wires (only a few are shown, not to scale, for illustrative purposes) that are wound about the core 28 within the winding slot 32 such that individual sets of windings 36 can be separated from other sets of windings 36 found in adjacent slots 32. Additionally shown, the slot liner 34 isolates the set of stator windings 36 from the set of posts 30 and the stator core 28. While only one set of stator windings 36 is shown, non-limiting aspects of the disclosure can include at least one set of windings 36 is wound around the axial ends of at least two posts 30 (henceforth, "end turns") and through at least two adjacent winding slots 32 such that the energization of the windings 36 form a magnetic pole 38 at the intervening post 30.

During operation of the electric machine the rotation of a magnetic field, for example, by way of a rotatable rotor assembly (not shown) relative to the stator assembly 26, the set of windings 36, the magnetic pole 38, or a combination thereof, generates a corresponding current in the stator windings 36 at the corresponding poles 38. The voltage or current generated in the stator windings 36 can ultimately be delivered to an output, for example, further electrically connected with the transmission lines 22.

The current generated in the stator windings 36 can also generate heat in the windings 36, for example, by way of resistive losses. The physical or thermal contact between the stator windings 36 and the stator core 28 (for example, via the slot liner 34) allows the heat generated in the windings 36 to be thermally conducted away from the windings 36, to the core 28. Heat conducted to the core 28 can further be conducted away from the electric machine or stator assembly 26, for example, by way of a thermally conductive stator sleeve assembly.

Figure 4:
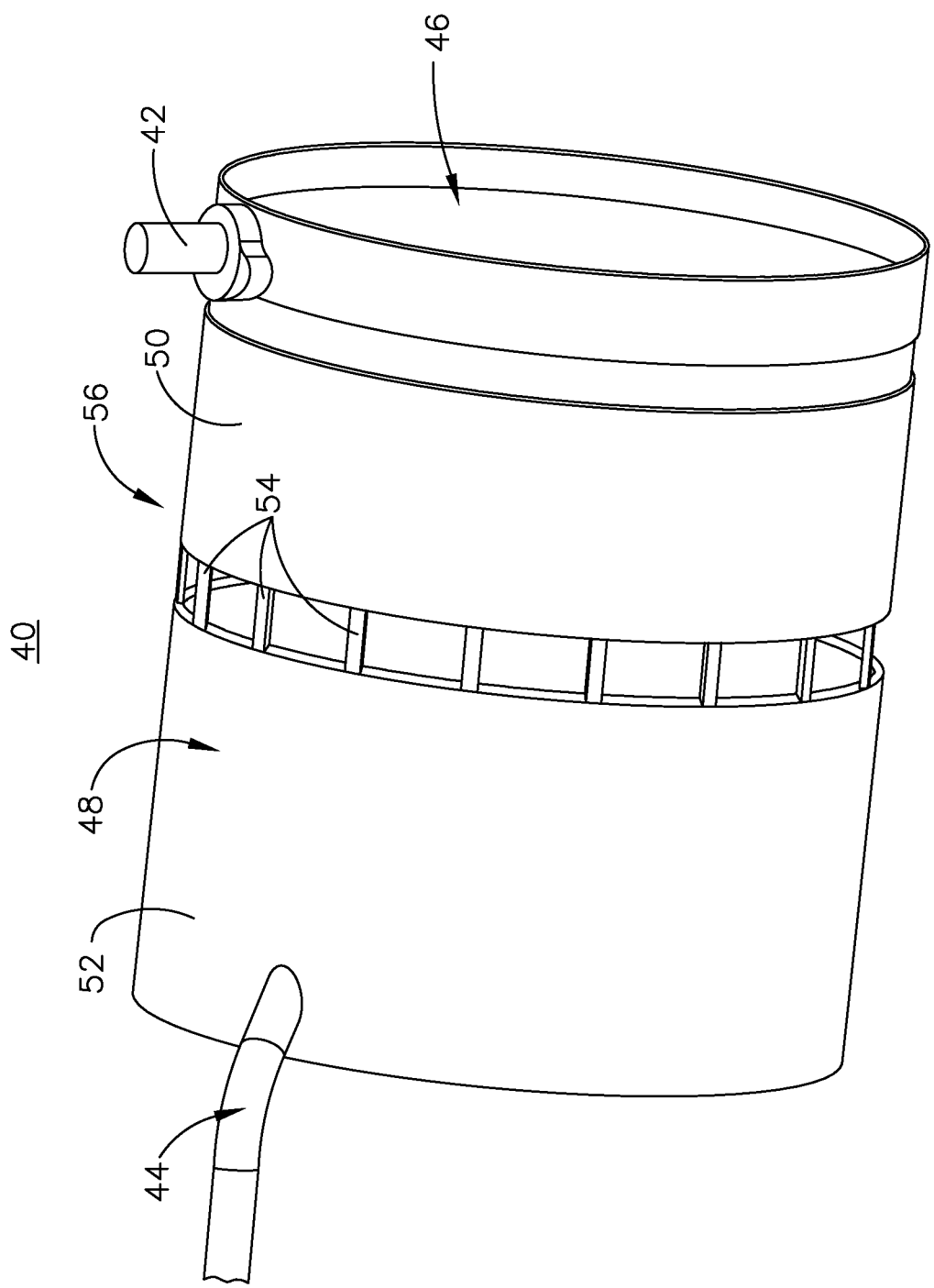
FIG. 4 is an isometric view of a stator sleeve for the backup generator of FIG. 1 or stator assembly of FIG. 2, in accordance with various aspects described herein.

FIG. 4 illustrates a perspective view of a stator sleeve assembly 40, in accordance with aspects of the disclosure. The stator sleeve assembly 40 can include a generally cylindrical housing 56 having an inner surface 46 and an outer surface 48, wherein, for example, the surfaces 46, 48 are generally circumferential. The inner surface 46 can define a housing 56 or sleeve assembly 40 opening adapted, sized, shaped, contoured, or otherwise configured to axially receive a stator assembly within the stator sleeve assembly 40, such as the stator assembly 26 of FIGS. 2 and 3. As used herein, "axially" can refer to a dimension extending through a radial center of the stator sleeve assembly 40. Additional stator assemblies can be included in aspects of the disclosure.

The stator sleeve assembly 40 or the stator housing 56 can further include a first cylindrical section 50 and a second cylindrical section 52, wherein the first and second cylindrical sections 50, 52 are axially spaced from each other. In one non-limiting example aspect of the disclosure, the first and second cylindrical sections 50, 52 can be axially spaced by a set of radially arranged and circumferentially spaced sleeve connectors 54. In another non-limiting aspect of the disclosure, the sleeve connectors 54 can be uniformly spaced in the circumferential direction. Each respective section 50, 52 can include aspects of the stator housing 56, inner surface 46, outer surface 48, or the like.

As shown, the stator sleeve assembly 40 or the stator housing 56 are also shown including a fluid inlet passage 42 and a fluid outlet passage 44. As shown, the fluid inlet and fluid outlet passages 42, 44 can be disposed or arranged on opposing axial portions or proximate to opposing axially terminating ends of the stator sleeve assembly 40 or the stator housing 56. For instance, in one non-limiting example configuration, the fluid inlet passage 42 is arranged on the first cylindrical section 50 while the fluid outlet passage 55 is arranged on the second cylindrical section 52. In another non-limiting example configuration, the stator sleeve assembly 40 can include a set of multiple fluid inlet passages 42, a set of multiple fluid outlet passages 44, or a combination thereof. In yet another non-limiting example configuration, the set of fluid inlet passages 42, the set of fluid outlet passages 44, or a combination thereof, can be circumferentially spaced or arranged about the periphery of the respective first or second sections 50, 52. While the passages 42, 44 are described as relative "inlet" or "outlet" passages, the respective labels of "inlet" or "outlet" are only used for identification purposes to aid the reader's understanding of the disclosure, and do not create limitations, particularly as to the position, orientation, or use thereof. For example, non-limiting aspects of the disclosure can include a fluid flow design or orientation in reverse to that illustrated, such that an "inlet" becomes an "outlet" and vice versa.

Figure 5:
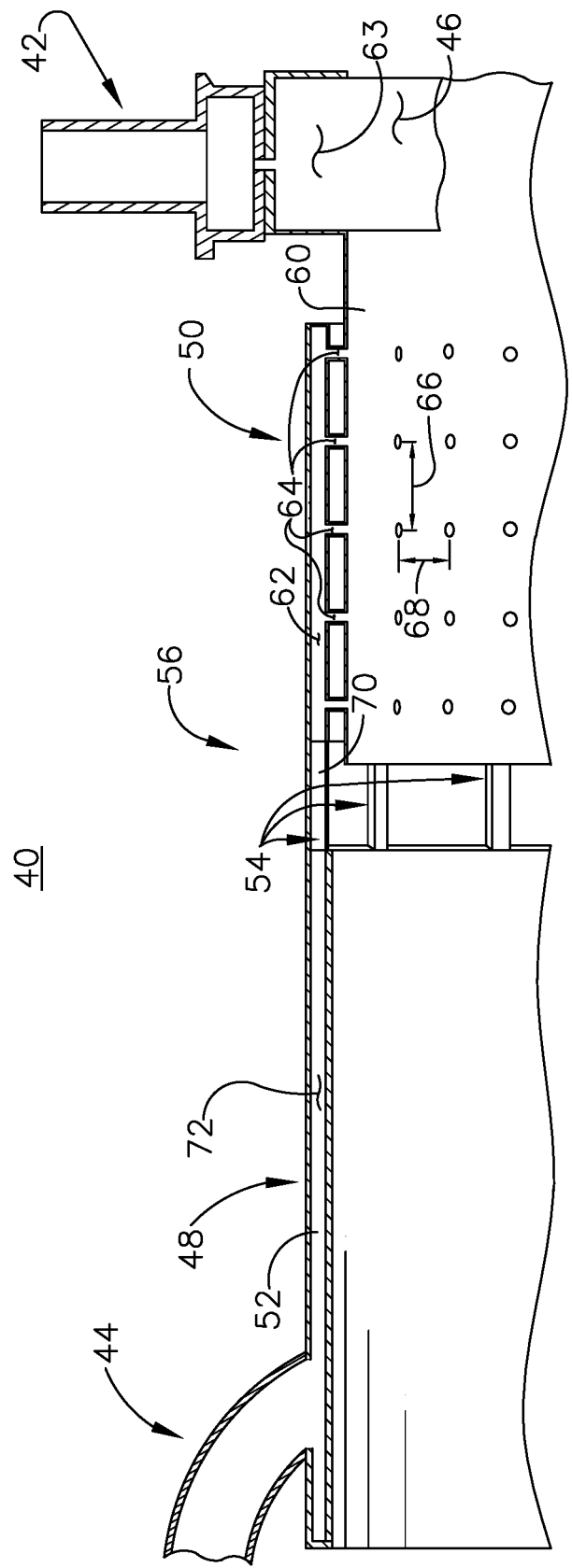
FIG. 5 is partial cross-sectional view of the stator sleeve, in accordance with various aspects described herein.

FIG. 5 illustrates a cross-sectional view of the stator sleeve assembly 40 of FIG. 4. As shown, the first cylindrical section 50 can include two radially spaced cavities, shown as an inner radial cavity 60 and an outer radial cavity 62. As used herein, the "inner" radial cavity 60 is used to denote that the cavity 62 has a radius from a centerline (such as a radial center of the first cylindrical section 50), smaller than the "outer" radial cavity 62. As shown, the inner radial cavity 60 can extend in the axial direction and be defined by at least an outer radial wall portion of the first cylindrical section 50 of the stator sleeve housing 56, defining the inner surface 46. The inner radial cavity 60 can include a partial or the entire circumferentially extending cavity bounded on the radially outward side by the outer radial wall defining the inner surface 46. As shown, the first cylindrical section 50 can also include an inlet cavity 63 defined by an axially extending portion of the first cylindrical section 50, at an axial end of the first cylindrical section 50. The inlet cavity 63 can be fluidly coupled or connected in a radial direction with at least a portion of the fluid inlet passage 42, and can be fluidly coupled or connected in an axial direction with at least a portion of the inner radial cavity 60. In this sense, the inner radial cavity 60 can be fluidly connected to at least a portion of the fluid inlet passage 42, for example, via the inlet cavity 63. In one non-limiting example, the inlet cavity 63 can be sized, shaped, contoured, or the like to ensure a circumferentially extending distribution of fluid received by the fluid inlet passage 42 via the cavity 63.

The outer radial cavity 62 can extend in the axial direction and be defined by at least an inner radial wall portion and an outer radial wall portion of the first cylindrical section 50 of the stator sleeve housing 56. In one non-limiting example, the outer radial wall portion defining the outer radial cavity 62 can at least partially define the outer surface 48 of the stator sleeve housing 56. At least a portion of the outer radial cavity 62 can radially overlap a corresponding axially extending portion of the inner radial cavity 60.

The first cylindrical section 50 of the stator sleeve housing 56 can also include a set of through-holes, ports, apertures, or radial fluid passages 64 fluidly connecting the inner radial cavity 60 with the outer radial cavity 62. For example, the set of radial fluid passages 64 can fluidly connect the inner and outer radial cavities 60, 62 by defining a radially extending passage there through. As shown, the set of radial fluid passages 64 can be axially spaced from one another (axial spacing shown as 66), circumferentially spaced from one another (circumferential spacing shown at 68), or a combination thereof. Non-limiting aspects of the set of radial fluid passages 64 can include, for instance, the set or a subset of radial fluid passages 64 arranged, disposed, grouped, organized, or the like, in passage sub sets.

For example, at least a subset of the radial fluid passages 64 can be arranged in circumferentially extending rows, axially extending rows, or a combination thereof. In another non-limiting example, at least a subset of the radial fluid passages 64 can be diagonally arranged (i.e. with reference to the axial or circumferential directions). In yet another non-limiting example, a first subset or row of radial fluid passages 64 can be axially or circumferentially offset relative to an adjacent or proximate second subset or row of radial fluid passages 64.

In another non-limiting aspect of the disclosure, at least a subset of the radial fluid passages 64 can be arranged to enable, provide, or ensure that a common fluid pressure is distributed about the inner radial cavity 60, when exposed to a fluid received in the inner radial cavity 60. In this sense, the arrangement or configuration can be adapted to regulate or fluidly distribute a fluid delivered to the inner radial cavity 60 about the inner radial cavity 60 to ensure a substantial fluid coverage of the inner radial cavity 60. In another sense, the arrangement or configuration can be adapted to regulate or fluidly distribute a fluid pressure within the inner radial cavity 60. In one non-limiting example, the arrangement or configuration is adapted to ensure a substantial portion or volume of the inner radial cavity 60 is occupied by a fluid or fluid volume in response to a regulated supply of fluid (e.g. a set or predetermined flow rate of fluid) delivered to the inner radial cavity 60, for example, by way of the fluid inlet passage 42. In another non-limiting example the size, dimension, contour, radius, diameter, or the like, of the set of radial fluid passages 64 can be adapted or configured to regulate or fluidly distribute the fluid delivered to the inner radial cavity 60, or a fluid pressure thereof. In this example, the size of the set of radial fluid passages 64 can effectively or operably reduce a flow rate of fluid supplied to the inner radial cavity 60 or traversing through the set of radial fluid passages 64, to ensure a sufficient, significant, or substantial amount or quantity of fluid coverage or distribution within the inner radial cavity 60. As used herein, a sufficient, significant, or substantial amount or quantity of fluid coverage or distribution within the inner radial cavity 60 can include greater than 60%, 70%, or 80% of volume of the inner radial cavity 60 occupied by a fluid volume. In another example, a sufficient, significant, or substantial amount or quantity of fluid coverage or distribution within the inner radial cavity 60 can include greater than 40%, 50%, or 60% porosity.

The sleeve connectors 54 can define a set of connector fluid passages 70 fluidly connecting the outer radial cavity 62 with the second cylindrical section 52. In this sense, the second cylindrical section 52 can define a third cavity 72 defined by the second cylindrical section 52 or the stator sleeve housing 56, fluidly connected with the connector fluid passages 70. In the illustrated example, the third cavity 72 is shown bounded or defined by an inner radial wall and an outer radial wall. Non-limiting aspects of the disclosure can include a set of the sleeve connectors circumferentially spaced about the stator sleeve housing 40 such that fluid carried within the set of cavities 60, 62, 72 described herein can be further axially traversed along the distribution of the set of sleeve connectors 54. In another non-limiting aspect, the circumferentially spaced set of sleeve connectors 54 can be arranged, disposed, or otherwise included to ensure an adequate, even, balanced, or distributed fluid flow traversing the aforementioned set of cavities 60, 62, 72, along the full or a partial portion of the cylindrical housing 56. Non-limiting aspects of the second cylindrical section 52, the third cavity 72, or the like can further include fluid-directing components, such as fins, blockers, dams, sets of passages, or the like, and are not germane to the current disclosure. The third cavity 72 can be further fluidly connected with the fluid outlet passage 44, as shown.

While the illustrated example demonstrates one non-limiting aspect of the disclosure, additional aspects or configurations of the current disclosure can be included. For example, non-limiting aspects of the disclosure can include the third cavity 72 not bounded by an inner radial wall, and exposed to the general interior of the stator sleeve housing 56 or stator assembly 26, similar to the configuration of the first cylindrical section 50 or inner radial cavity 60. Similarly, non-limiting aspects of the disclosure can include the inner radial cavity 60 having an inner radial wall bounding or defining the inner radial cavity 60.

While only a limited portion of the stator sleeve assembly 40 cross section is illustrated in FIG. 5, non-limited aspects of the disclosure can include at least a subset of the inner or outer radial cavities 60, 62, the inlet cavity 63, the radial fluid passages 64, the sleeve connectors 54, the third cavity 72, or a combination thereof, arranged, duplicated, configured, or otherwise included along at least a portion of the circumference of the stator sleeve assembly 40. For example, non-limiting aspects of the disclosure can include the illustrated components repeated along the entire circumference of the stator sleeve assembly 40.

Figure 6:
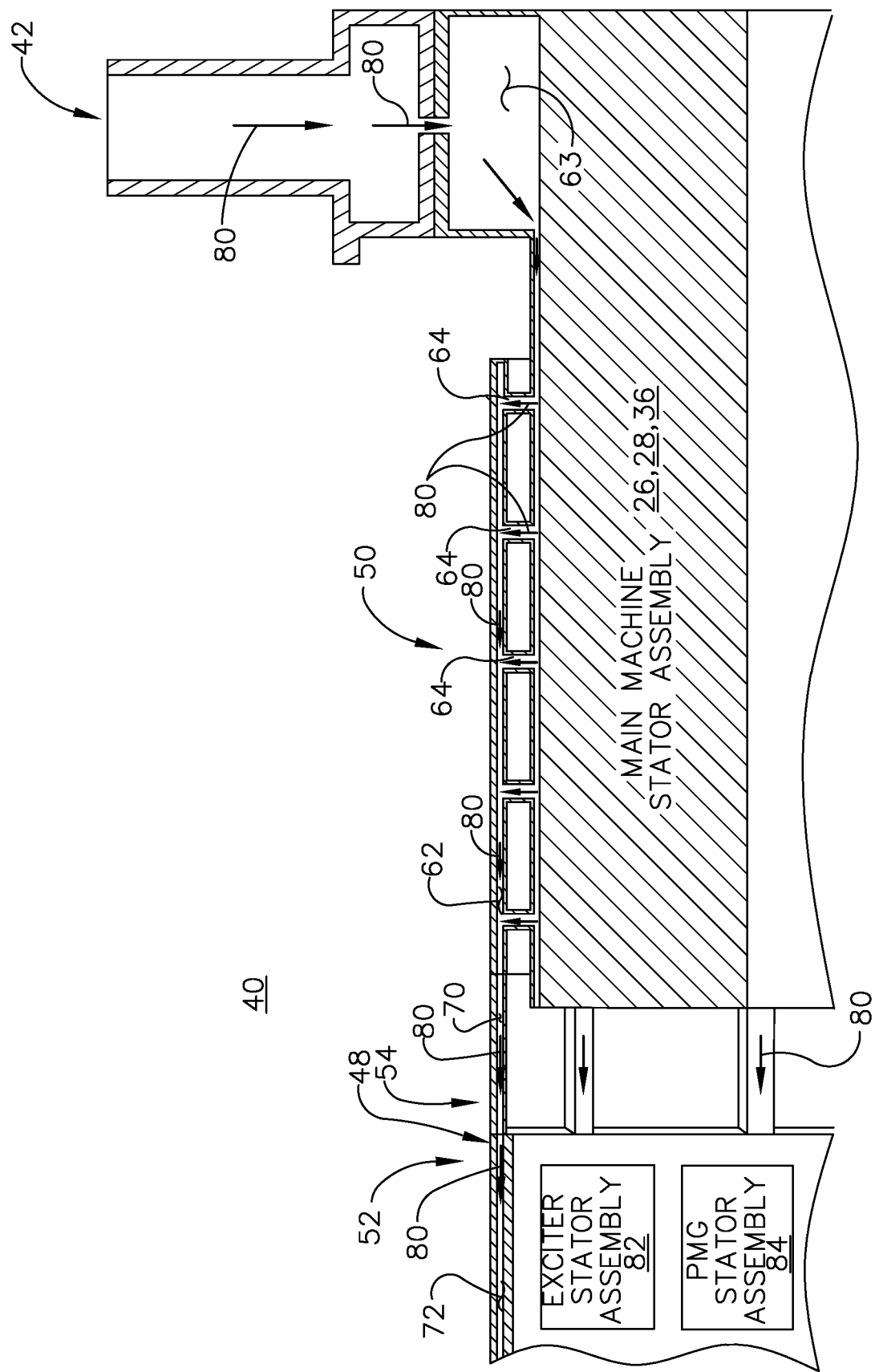
FIG. 6 is schematic view of the stator sleeve including coolant flow relative to a subset of backup generator components, in accordance with various aspects described herein.

FIG. 6 illustrates a schematic view of a flow of fluid through the stator sleeve assembly 40. In the illustrated example, the fluid, which can include a flow of coolant or cooling fluid, is generally represented by arrows 80. Non-limiting examples of coolant or cooling fluid can include liquids such as oil or water, or gases. As shown, a fluid coolant flow 80 can be received at the fluid inlet passage 42. The fluid coolant flow 80 can originate from a coolant pump, a coolant reservoir, or the like, and is not germane to the current disclosure. The fluid coolant flow 80 flows through the fluid inlet passage 42 to the inlet cavity 63, which is schematically shown bounded or limited on the inner radial wall by a stator assembly, such as the stator assembly 26 described herein, and wherein it can be circumferentially distributed about the stator assembly 26. The fluid coolant flow 80 can further axially flow from the inlet cavity 63 to the inner radial cavity 60, which is schematically shown bounded or limited on the inner radial wall by a stator assembly, such as the stator assembly 26 described herein. The fluid coolant flow 80 can axially traverse at least a portion of the inner radial cavity 60 along the stator assembly 26.

During generator operations, the current generated in the stator windings 36 can also generate heat in the windings 36, which is thermally conducted to the stator assembly 26 or the stator core 28. As shown, at least a portion of the heat conducted to the stator assembly 26 or the stator core 28 in the stator windings 36 can be further thermally conducted from the stator assembly 26 to the fluid coolant flow 80 traversing the inner radial cavity 60. The fluid coolant flow 80 traversing the inner radial cavity 60 can extend circumferentially about the entire stator sleeve assembly 40, as explained herein, allowing for a sufficient amount of coolant fluid to remove heat from the entire cylindrical stator assembly 26.

The fluid coolant flow 80 is then bounded in the in the inner radial cavity 60 such that the flow 80 pressure pushes, lifts, or otherwise flows radially outwardly through the radial fluid passages 64 to the outer radial cavity 62, which it can further flow axially toward the set of sleeve connectors 54. The fluid coolant flow 80 can then axially flow from the inner radial cavity 60 through the set of connector passages 70 to the third cavity 72. The circumferentially spaced set of sleeve connectors 54 can ensure the fluid coolant flow 80 is distributed in the axial direction to ensure an adequate, even, balanced, or distributed fluid flow to toward the third cavity 72. In non-limiting examples, the third cavity 72 or the second cylindrical section 52 can be further thermally connected with another stator assembly, schematically illustrated as an exciter stator assembly 82, a permanent magnet generator (PMG) stator assembly 84, or a combination thereof. In this sense, aspects of the disclosure can provide further heat removal, cooling, or the like, of stator assemblies 26, 82, 84 arranged, disposed, or otherwise thermally connected with the second cylindrical section 52. The fluid coolant flow 80 can further axially traverse the third cavity 72, and can be received at the fluid outlet passage 44 (not shown in FIG. 6).

Figure 7:
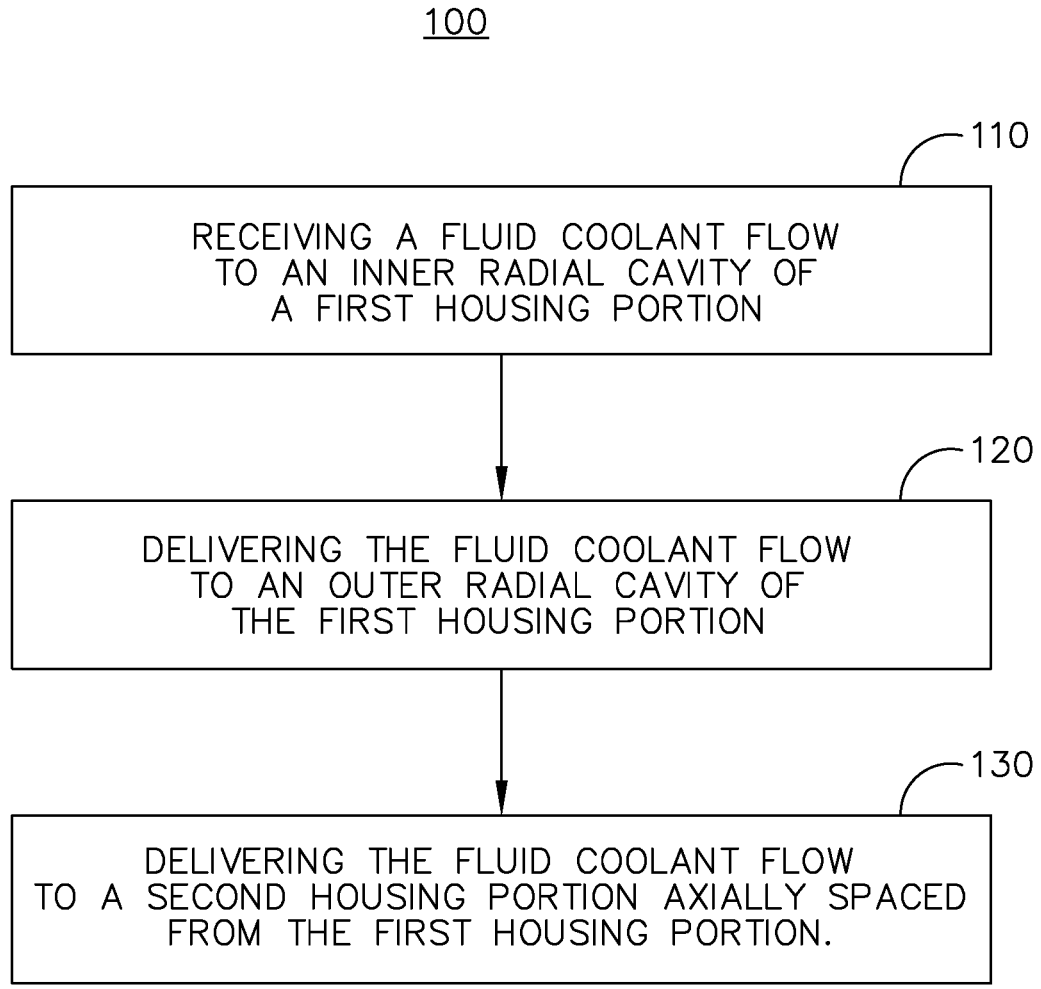
FIG. 7 is an example flow chart demonstrating a method for cooling at stator assembly in accordance with various aspects described herein.

FIG. 7 illustrates a method 100 for cooling at stator assembly in accordance with various aspects described herein. The method 100 begins by receiving a fluid coolant flow 80 to a first housing portion 50 having an inner radial cavity 60 thermally connected with the stator assembly 26, at 110. Next, the method 100 continues by delivering the fluid coolant flow 80 to an outer radial cavity 62 of the first housing portion 50, the outer radial cavity 62 overlapping at least a portion of the inner radial cavity 60, and fluidly connected with the inner radial cavity 60 by a set of radial passages 64 circumferentially spaced about the first housing portion 50, at 120. Then the method 100 delivers the fluid coolant flow 80 to a second housing portion 52 axially spaced from the first housing portion 50 and fluidly connected with the outer radial cavity 62 by a set of circumferentially spaced fluid passages 70 of the sleeve connectors 54, at 130.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method.

The aspects of the disclosure provide for or enable a stator sleeve assembly for cooling a stator or stator assembly of an electric machine. Many other possible aspects or configurations in addition to that shown in the above figures are contemplated by the present disclosure. Additionally, the design and placement of the various components can be rearranged such that a number of different in-line configurations could be realized.

One advantage of the above-described aspects is that the stator sleeve assembly described herein can increase the effective surface area of cooling for the stator assembly by allowing for a flow of coolant fluid to be distributed along a significant circumferential portion of the stator sleeve assembly. The arrangement of passageways enable the axial and circumferential distribution of the coolant flow in the inner radial cavity, the radial distribution of coolant flow from the inner radial cavity to the outer radial cavity, and the axial and circumferential distribution of the coolant from to the second cylindrical section. In this sense, the arrangement of passageways enable or allow for the distribution of fluid coverage by regulating or configuring fluid pressure over a larger stator sleeve assembly distribution. In one non-limiting aspect, the distribution of fluid coverage can enable uniform coolant flow and support a minimal pressure threshold (e.g. eliminate or reduce pressure drop) of the coolant flow. In one non-limiting example, the pressure drop in the current disclosure can be 80% less than in a conventional stator sleeve cooling assembly.

In turn, an advantage of the above-described aspects can result in a generator or electric machine selectively operable to provide electrical power generation according to desired environmental operational characteristics.

The above-described stator sleeve assembly can also reduce maintenance costs by allowing for effective fluid cooling without having to significantly replace or redesign the electric machine. In one example, uniform cooling of the electric machine improves the life of the stator assembly and the thermal environment of the electric machine.

The resulting common generator aspects can utilize common parts for repair and replacement regardless of the stator sleeve assembly of the generator. By utilizing common parts, a fleet of generators can be maintained using fewer total parts, less maintenance training (due to a reduced total number of replaceable or utilized components), reduced part and generator unit costs, and minimized non-recurring engineering costs.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator sleeve assembly comprising:
a first cylindrical housing portion defining an inner radial cavity defined by at least one outer circumferential wall adapted to envelop a stator assembly, and at least a portion of the stator assembly, and an outer radial cavity defined by at least two circumferential walls, the outer radial cavity overlying at least an axial portion of the inner radial cavity, and a set of radial passages fluidly connecting the inner radial cavity with the outer radial cavity;

a second cylindrical housing portion defining a third cavity, the second housing portion axially spaced from the first housing portion; and a set of circumferentially spaced sleeve elements coupling the first and second cylindrical housing portions, the sleeve elements defining a set of axial fluid passages fluidly connecting the outer radial cavity with the third cavity;

wherein the first and second cylindrical housing portions are axially spaced by the set of circumferentially spaced sleeve elements.

2. The stator sleeve assembly of claim 1 wherein the inner radial cavity, the set of radial passages, the outer radial cavity, the axial fluid passages, and the third cavity define at least a portion of a cooling system fluid flow.

3. The stator sleeve assembly of claim 2, further comprising a fluid coolant flow traversing the cooling system fluid flow.

4. The stator sleeve assembly of claim 3 wherein the fluid coolant flow removes heat from the stator assembly.

5. The stator sleeve assembly of claim 1 wherein the stator assembly is a main machine generator stator assembly.

6. The stator sleeve assembly of claim 1 wherein the third cavity is adapted to overly at least one stator assembly.

7. The stator sleeve assembly of claim 6 wherein the stator assembly is at least one of a permanent magnet generator stator assembly or an exciter stator assembly.

8. The stator sleeve assembly of claim 1 wherein the set of radial passages are arranged about the at least one circumferential wall of the inner radial cavity.

9. The stator sleeve assembly of claim 8 wherein the arrangement of the set of radial passage is adapted to regulate fluid coolant flow through the inner radial cavity.

10. The stator sleeve assembly of claim 9 wherein the size of the set of radial passages are adapted to regulate fluid coolant flow through the inner radial cavity.

11. The stator sleeve assembly of claim 8 wherein the arrangement of the set of radial passage is adapted to distribute fluid coolant flow throughout a substantial portion of the inner radial cavity.

12. The stator sleeve assembly of claim 1 wherein the set of circumferentially spaced axial fluid passages are arranged about the full circumference of the first and second housing portions.

13. The stator sleeve assembly of claim 12 wherein the set of circumferentially spaced axial fluid passages are arranged to supply a fluid coolant flow about the full circumference of the third cavity.

14. A stator assembly for an electric machine comprising:
a stator core having multiple posts;
multiple windings, with a winding provided on each of the posts; and
a stator sleeve located about the stator core and an inner surface confronting the stator core and comprising:
a first cylindrical housing portion defining an inner radial cavity defined by at least one outer circumferential wall adapted to envelop the stator core, and at least a portion of the stator sleeve, in a thermally conductive confronting relationship with the stator core and an outer radial cavity, the outer radial cavity overlying at least an axial portion of the inner radial cavity, and a set of radial passages fluidly connecting the inner radial cavity with the outer radial cavity;

a second cylindrical housing portion defining a third cavity, the second housing portion axially spaced from the first housing portion; and a set of circumferentially spaced sleeve elements coupling the first and second cylindrical housing portions, the sleeve elements defining a set of axial fluid passages fluidly connecting the outer radial cavity with the third cavity;

wherein the first and second cylindrical housing portions are axially spaced by the set of circumferentially spaced sleeve elements; and wherein the inner radial cavity, the set of radial passages, the outer radial cavity, the set of axial fluid passages, and the third cavity define a fluid coolant flow path whereby coolant can be provided to the inner radial cavity to the third cavity.

15. The stator assembly of claim 14 wherein the fluid coolant flow removes heat from the stator assembly.

16. The stator assembly of claim 14 wherein the set of radial passages are adapted to regulate fluid coolant flow through the inner radial cavity.

17. A method of cooling a stator assembly, comprising:
receiving a fluid coolant flow to a first cylindrical housing portion defining an inner radial cavity defined by at least one outer circumferential wall adapted to envelop the stator assembly, and at least a portion of a stator sleeve, thermally connected with the stator assembly;
delivering the fluid coolant flow to an outer radial cavity of the first cylindrical housing portion, the outer radial cavity overlapping at least a portion of the inner radial cavity, and fluidly connected with the inner radial cavity by a set of radial passages circumferentially spaced about the first cylindrical housing portion; and
delivering the fluid coolant flow to a second cylindrical housing portion axially spaced from the first cylindrical housing portion and fluidly connected with the outer radial cavity by a set of circumferentially spaced sleeve elements coupling the first and second cylindrical housing portions such that the first and second cylindrical housing portions are axially spaced by the set of circumferentially spaced sleeve elements, the sleeve elements defining a set of fluid passages;
wherein the fluid coolant flow removes heat from the stator assembly.

18. The method of claim 17, further comprising operating an electric machine whereby the operating generates heat in a set of windings supported by the stator assembly.

19. The method of claim 17 wherein the set of radial passages are adapted for at least one of regulating or distributing the fluid coolant flow through a substantial portion of the inner radial cavity.

* * * * *

UNITED STATES PATENT AND TRADEMARK OFFICE
CERTIFICATE OF CORRECTION

PATENT NO.       : 11,128,201 B2
APPLICATION NO.  : 15/696801
DATED            : September 21, 2021
INVENTOR(S)      : Pradeep Hemant Sangli, Santosh Kumar Prasad and Todd Eric Rook Page 1 of 1

It is certified that error appears in the above-identified patent and that said Letters Patent is hereby corrected as shown below:

In the Claims

Column 12, Lines 32-33, should read:
…and at least a portion of the stator sleeve, thermally connected with the stator assembly;

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*